(12) United States Patent
Rub et al.

(10) Patent No.: US 6,212,661 B1
(45) Date of Patent: Apr. 3, 2001

(54) STATIC VITERBI DETECTOR FOR CHANNELS UTILIZING A CODE HAVING TIME VARYING CONSTRAINTS

(75) Inventors: Bernardo Rub, Edina; Hamid R. Shafiee, Bloomington, both of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/131,584

(22) Filed: Aug. 10, 1998

Related U.S. Application Data

(60) Provisional application No. 60/055,351, filed on Aug. 11, 1997.

(51) Int. Cl.[7] .......................... H03M 13/41; G11B 20/18
(52) U.S. Cl. .......................... 714/769; 714/792; 714/795
(58) Field of Search ..................... 714/769, 792, 714/786, 794, 795; 360/53; 341/59, 58

(56) References Cited

U.S. PATENT DOCUMENTS

| | | | |
|---|---|---|---|
| 4,321,632 | 3/1982 | Leis et al. ........................ | 360/49 |
| 4,567,591 | 1/1986 | Gray et al. ....................... | 370/109 |
| 4,571,734 | 2/1986 | Dolivo et al. ..................... | 375/18 |
| 4,593,353 | 6/1986 | Pickholtz ......................... | 364/200 |
| 4,789,994 | 12/1988 | Randall et al. .................... | 375/12 |
| 5,036,408 | 7/1991 | Leis et al. ........................ | 360/48 |
| 5,081,651 | 1/1992 | Kubo ............................... | 375/94 |
| 5,121,262 | 6/1992 | Squires et al. .................... | 360/46 |
| 5,243,605 | * 9/1993 | Lekmine et al. ................... | 371/43 |
| 5,253,131 | 10/1993 | Chevalier ........................ | 360/78.14 |
| 5,278,703 | 1/1994 | Rub et al. ........................ | 362/51 |
| 5,291,499 | 3/1994 | Behrens et al. .................... | 371/43 |
| 5,311,376 | 5/1994 | Joan et al. ........................ | 328/155 |
| 5,321,559 | 6/1994 | Nguyen et al. .................... | 360/46 |
| 5,327,440 | * 7/1994 | Fredrickson et al. .............. | 371/43 |
| 5,341,249 | 8/1994 | Abbott et al. .................... | 360/46 |
| 5,341,386 | * 8/1994 | Shimoda et al. .................. | 371/43 |
| 5,341,387 | 8/1994 | Nguyen ........................... | 371/45 |
| 5,349,608 | 9/1994 | Graham et al. .................... | 375/94 |
| 5,353,352 | 10/1994 | Dent et al. ....................... | 380/37 |
| 5,355,261 | 10/1994 | Taratorin ......................... | 360/53 |
| 5,383,064 | 1/1995 | Harman ........................... | 360/45 |
| 5,390,198 | 2/1995 | Higgins ........................... | 371/43 |
| 5,404,249 | 4/1995 | Seki ............................... | 360/48 |
| 5,434,807 | 7/1995 | Yoshida ........................... | 364/717 |
| 5,438,462 | 8/1995 | Copolillo ........................ | 360/53 |
| 5,440,588 | 8/1995 | Murakami ........................ | 375/341 |
| 5,451,943 | 9/1995 | Satomura ........................ | 341/58 |
| 5,454,014 | 9/1995 | Blanker et al. .................... | 375/341 |
| 5,486,956 | 1/1996 | Urata ............................. | 360/65 |
| 5,502,735 | 3/1996 | Cooper ........................... | 371/43 |
| 5,521,767 | 5/1996 | Weng et al. ...................... | 360/46 |
| 5,521,945 | 5/1996 | Knudson ......................... | 375/341 |
| 5,539,774 | 7/1996 | Nobakht et al. ................... | 375/232 |
| 5,553,169 | 9/1996 | Mizuoka ......................... | 382/282 |
| 5,576,707 | 11/1996 | Zook .............................. | 341/58 |

(List continued on next page.)

FOREIGN PATENT DOCUMENTS

| | | |
|---|---|---|
| 0 087 907 A2 | 9/1983 | (EP) . |
| 0 581 717 A2 | 2/1994 | (EP) . |
| WO 96/24932 | 8/1996 | (WO) . |

OTHER PUBLICATIONS

"Error Control Coding Fundamentals and Applications", by Shu Lin, University of Hawaii, Texas A&M University and Daniel J. Costello, Jr., Illinois Institute of Technology, (1983) pp. 528–531.

(List continued on next page.)

*Primary Examiner*—Stephen Baker
(74) *Attorney, Agent, or Firm*—Joseph R. Kelly; Westman, Champlin & Kelly, P.A.

(57) ABSTRACT

A detector is used in detecting data encoded in a read signal received from a storage channel. The detector includes a Viterbi detector having a time-invariant structure configured to detect the data encoded according to a code having time varying constraints.

20 Claims, 6 Drawing Sheets

U.S. PATENT DOCUMENTS

| | | | |
|---|---|---|---|
| 5,586,128 | | 12/1996 | Chen ........................................ 371/43 |
| 5,588,011 | | 12/1996 | Riggle ..................................... 371/43 |
| 5,717,535 | | 2/1998 | French et al. ........................... 360/53 |
| 5,731,768 | * | 3/1998 | Tsang ...................................... 341/59 |
| 5,771,127 | | 6/1998 | Reed et al. .............................. 360/51 |
| 5,859,601 | * | 1/1999 | Moon et al. ............................ 341/59 |
| 5,916,315 | * | 6/1999 | Ryan ..................................... 714/786 |
| 5,936,558 | * | 8/1999 | Shafiee et al. .......................... 341/59 |
| 5,949,357 | * | 9/1999 | Fitzpatrick et al. .................... 341/68 |
| 6,032,284 | * | 2/2000 | Bliss ..................................... 714/792 |

OTHER PUBLICATIONS

A. Patel, R. Rutledge and B. So, "Performance Data for a Six–Sample Look–Ahead, 1, 7 ML Detection Channel", *IEEE Transaction on Magnetics*, vol. 29, No. 6, pp. 4012–4014, Nov. 1993.

J. Moon and B. Brickner, "Design of a Rate 5/6 Maximum Transition Run Code", Digests of Intermag, 1997.

J.W.M. Bergmann, S.A. Rajput and F.A.M. van de Larr, "On The Use of Decision Feedback for Simplifying the Viterbi Detector", *Phillips Journal of Reseach*, vol. 42, No. 4, pp. 399–428, 1987.

R. Yamasaki et al., "A 1, 7 code EEPR4 Read Channel IC with Analog Noise Whitened Detector", *Proceedings of ISSCC*, 1997, pp. 316–317.

J.D. Coker et al., "Implementation of PRML in a Rigid Disk Drive", *IEEE Transaction on Magnetics*, vol. 27, No. 6, pp. 4538–4542, Nov. 1991.

L. Richard Carley et al., "A Low–Power Analog Sampled–Data VLSI Architecture for Equalization and FDTS/DF Detection", *IEEE Transaction on Magnetics*, vol. 31, No. 2, pp. 1202–1207, Mar. 1995.

B. Brickner and J. Moon, "A High–Dimensional Signal Space Implementation of FDTS/DF", *IEEE Transaction on Magnetics*, vol. 32, No. 5, pp. 3941–3943, Sep. 1996.

J. Moon and B. Brickner, "Maximum Transition Rund Codes for Data Storage Systems", *IEEE Transactions on Magnetics*, vol. 32, No. 5, pp. 3992–3994, Sep. 1996.

J. Moon and B. Brickner, "Design of a Rate 6/7 Maximum Transition Run Code", *IEEE Transaction on Magnetics*, vol. 33, No. 5, pp. 2749–2751, Sep. 1997.

W.G. Bliss, "An 8/9 Rate Time–Varying Trellis Code for High Density Magnetic Recording", Digests of Intermag, 1997.

R.T. Behrens and A.J. Armstrong, "An Advanced Read/Write Channel for Magnetic Disk Storage" *IEEE Computer Society Press*, vol. 2, No. 2, pp. 956–960, Oct. 1992.

K. Knudson et al., "Dynamic Threshold Implementation of the Maximum–Likelihood Detector for the EPR4 Channel", *IEEE Global Telecommunication Conference*, vol. 3, No. 3, pp. 2135–2139, Dec. 1991.

M. Kobayashi et al., "Beyond $1 \mu m^2$/bit High Density of Recording with Improved QAM Technique", *IEEE Transactions on Consumer Electronics*, vol. 37, No. 3, pp. 284–290, Aug. 1991.

L.C. Barbosa, "Maximum Likelihood Sequence Estimators: A Geometric View", *IEEE Transactions on Information Theory*, vol. 35, No. 2, pp. 419–427, Mar. 1989.

Robert A. Hawley et al., "A 300 MHz Digital Double–Sideband to Single–Sideband Converter in $1 \mu m$ CMOS", *IEEE Journal of Solid–State Circuits*, vol. 30, No. 1, Jan. 1995.

"Digital Communication", by Edward A. Lee, University of California at Berkeley, and David G. Messerschmitt, University of California at Berkeley, pp. 275–286.

Hamid Shafiee et al., "Signal Space Detectors for MTR–Coded Magnetic Recording Channels", Seagate Technology, Jun. 1997.

* cited by examiner

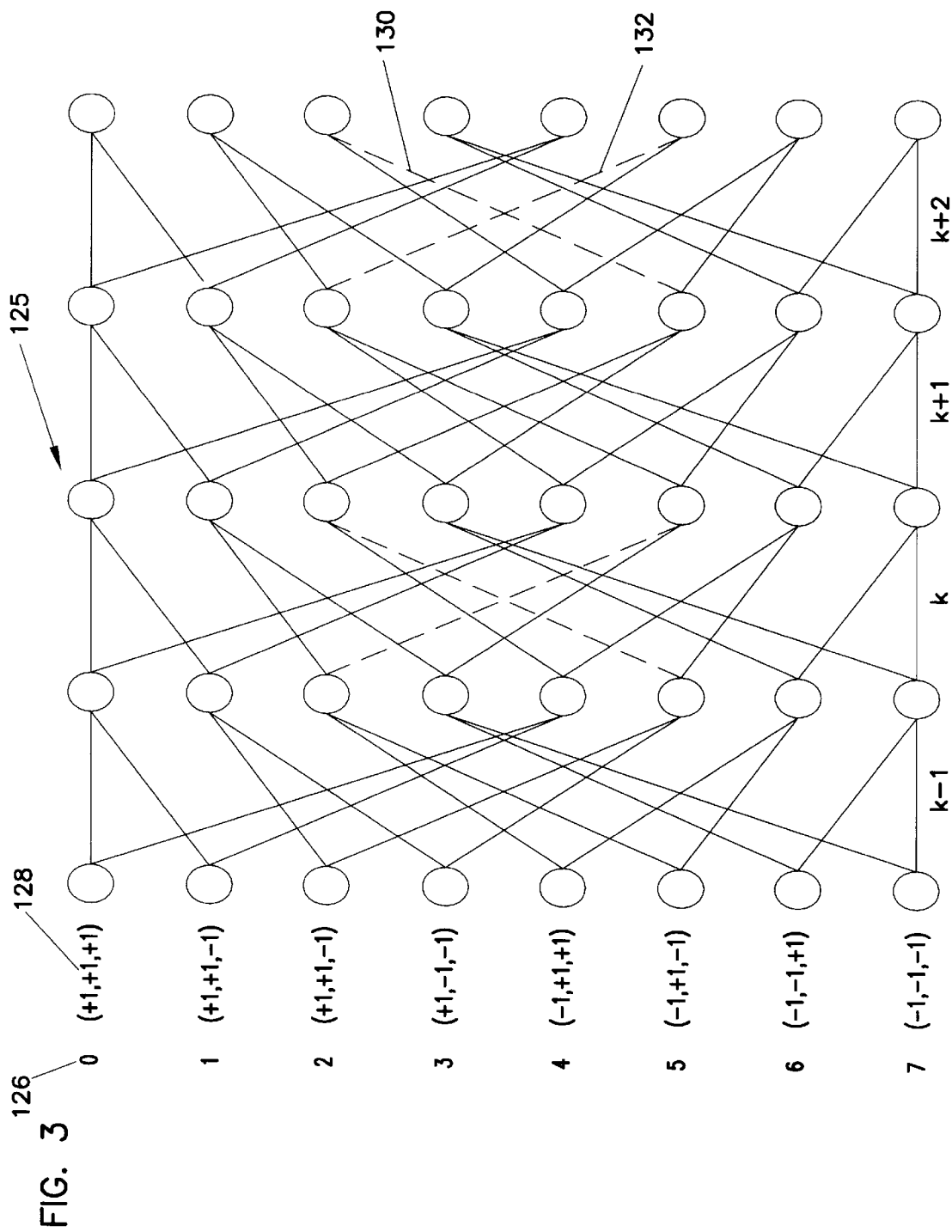

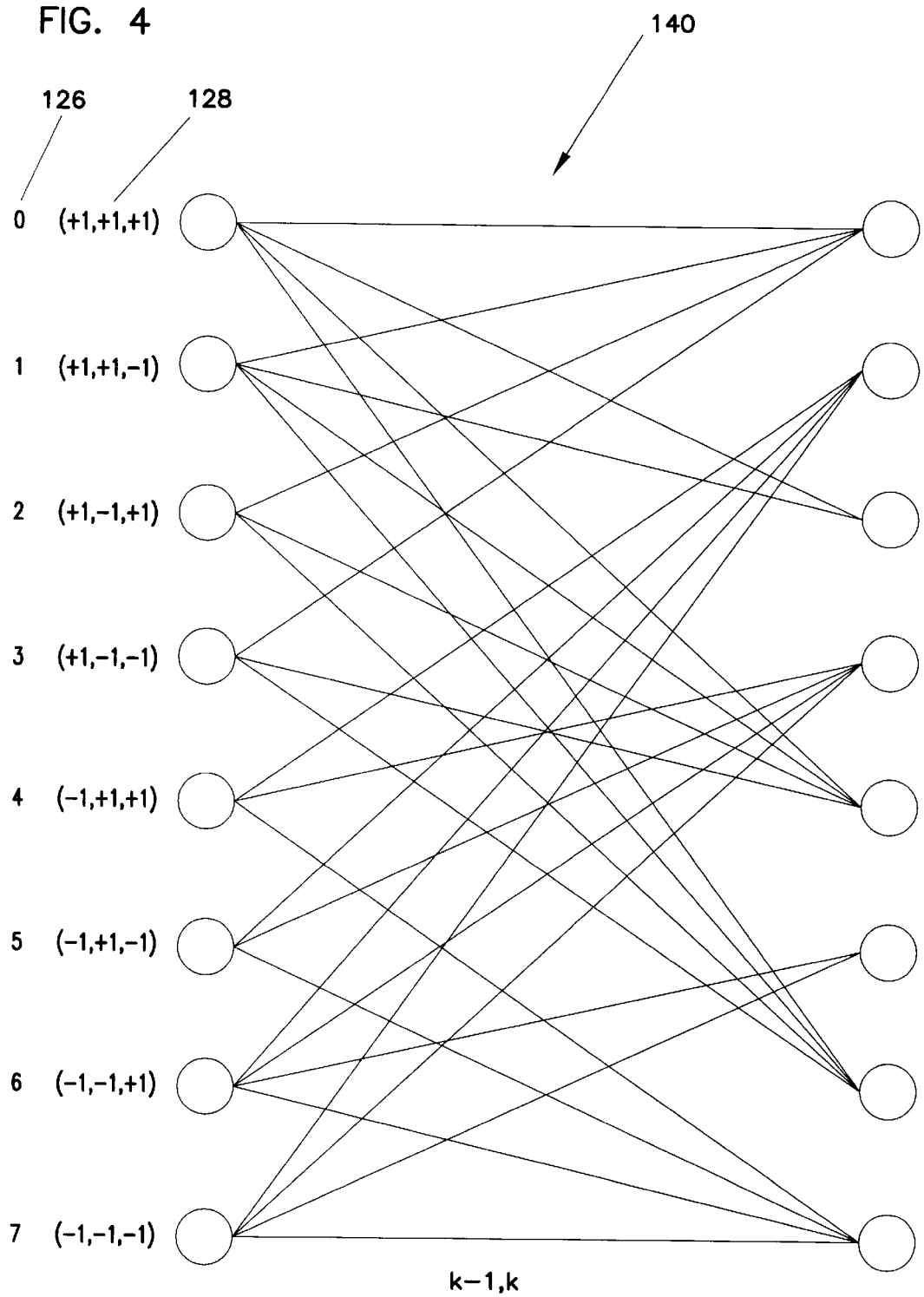

STATIC VITERBI DETECTOR FOR CHANNELS UTILIZING A CODE HAVING TIME VARYING CONSTRAINTS

REFERENCE TO RELATED APPLICATION

The present application claims priority from provisional application serial number 60/055,351 filed on Aug. 11, 1997.

FIELD OF THE INVENTION

The present invention relates to disc drives. More particularly, the present invention relates to a data detector in a disc drive wherein the data detector detects data encoded according to a code having time varying constraints, and wherein the data detector has a time invariant structure.

BACKGROUND OF THE INVENTION

A typical disc drive includes one or more discs mounted for rotation on a hub or spindle. A typical disc drive also includes a transducer supported by a hydrodynamic air bearing which flies above each disc. The transducer and the hydrodynamic air bearing are collectively referred to as a data head. A drive controller is conventionally used for controlling the disc drive based on commands received from a host system. The drive controller controls the disc drive to retrieve information from the discs and to store information on the discs.

In one conventional disc drive, an electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of discs by providing a write signal to the data head to write information on the surface of the disc representing the data to be stored. In retrieving data from the disc, the drive controller controls the electromechanical actuator so that the data head flies above the disc, sensing the flux reversals on the disc, and generating a read signal based on those flux reversals. The read signal is typically conditioned and then decoded by the drive read/write channel and the controller to recover the data.

A typical data storage channel includes the disc, the data head, automatic gain control circuitry, a low pass filter, an analog-to-digital converter, a data detector, and a decoder. The read channel can be implemented either as discrete circuitry, or in a drive controller associated with the disc drive. Such a drive controller typically includes error detection and correction components as well.

A Viterbi detector has been used in the past as a data detector in a disc drive read channel. A Viterbi detector acts as a maximum-likelihood sequence estimator when the input to the detector consists of a signal plus additive white, Gaussian noise, and when a typical branch metric (the square of the error in the signal provided to the detector) is used.

In digital magnetic recording, the pulse response of the channel has conventionally been equalized to a suitable partial response (PR) target of the form $(1-D)(1+D)^n$, wherein n is a non-negative integer and D is a delay operator. A number of different PR targets have been developed. For example, when n=1, 2, and 3, the resulting PR targets are referred to as partial response class 4 (PR4), extended partial response class 4 (EPR4), and enhanced extended partial response class 4 ($E^2$PR4) channels, respectively.

Forcing the magnetic channel pulse response to a prescribed target generally results in noise enhancement and noise correlation. To reduce such effects, the channel target response can be generalized to a PR polynomial of the form:

$$f(D)=1+f_1D+f_2D^2+\ldots+f_nD^n$$

where, without loss of generality, $f_0$ is normalized to 1 and the $f_i$ terms are allowed to take non-integer values.

Given the generalized channel target response set out above, the number of states required in a Viterbi trellis is equal to $2^n$. For example, a Viterbi detector for the $E^2$PR4 channel given by:

$$f_{E^2PR4}(D)=1+2D-2D^3-D^4$$

has $2^4=16$ states. Of course, as n is increased, the number of Viterbi states can become prohibitively large. In order to alleviate the complexity of such detectors, local feedback can be implemented in order to eliminate some of the intersymbol interference (ISI) terms. Such detectors are referred to as reduced-state sequence estimators (RSSE) and include $2^m$ states and (n−m) feedback taps, where m is less than or equal n.

The bit error rate performance of Viterbi detectors is dominated by the minimum Euclidean distance between two disjoint channel output sequences. In digital magnetic recording, it has been observed that the dominant error events from maximum likelihood sequence detectors at high linear recording densities as well as certain high order PR channels (such as $E^2$PR4) are generally of the form +/− (2, −2, 2). Here, the error event denotes the difference between two input sequences, when the input bits are +/−1. Such errors are typically caused when a tribit is shifted by one sample time, or when a quadbit is mistaken as a dibit or vice versa.

SUMMARY OF THE INVENTION

A relatively new class of codes are recently being investigated. Such codes include a maximum transition run (MTR) code which has been proposed as a way of removing such dominant error events from the input bit stream to the data detector. Such MTR codes operate to increase the minimum Euclidean distance between data samples in a magnetic recording channel.

For example, an MTR=2 code limits the run of consecutive transitions in the modulated waveform to 2. In essence, an MTR=2 code removes all patterns of encoded data containing more than two consecutive transitions. Consequently, the MTR=2 code also removes all patterns which cause a dominant error event for MLSD detectors at high recording densities and higher order PR channels.

It has also been observed that the same dominant error events can be removed if the MTR constraint is relaxed. In other words, a relaxed MTR constraint may allow runs of three consecutive transitions, but require them to start once every L time intervals. Thus, for instance, with L=2, the tribits can start at every other time interval. Such codes are referred to as time-variant MTR codes.

In order to realize any modulation coding gain, the code constraint must be enforced during the detection process. Specifically, any states or branches in the Viterbi trellis which violate the coding constraints must be removed from the detector structure. With a time-variant MTR code, the trellis diagram needs to be modified once every L time intervals in order to allow for the presence of a tribit. For example, for an 8-state detector, the two branches which correspond to the presence of tribits are normally removed from the trellis, but they are restored every L time intervals for a single time interval.

Viterbi detectors used in conjunction with such time-variant-MTR coded channels are thus inherently time-variant, themselves. Such detectors can be implemented by providing a selection input to the detector such that operation of the detector can be switched among various operating modes in order to accommodate the time-varying nature of the coded channel, and in order to implement a time varying trellis structure. The time-varying detector structure is undesirably complex.

The present invention addresses these and other problems, and offers other advantages over the prior art.

In accordance with one aspect of the present invention, a detector is used in detecting data encoded in a read signal received from a storage channel. The detector includes a Viterbi detector having a time-invariant structure configured to detect the data encoded according to a code having time varying constraints.

The present invention can be implemented as a detector, a method for detecting data, or as a method of forming such a detector.

BRIEF DESCRIPTION OF THE DRAWINGS

FIGS. 2-B and 2-C are waveforms illustrating dominant error events of the form +/− (2, −2, 2).

FIG. 3 is an extended trellis diagram illustrating the operation of a Viterbi detector.

FIG. 4 is a trellis diagram illustrating the operation of radix-4 Viterbi detector in accordance with one aspect of the present invention.

DETAILED DESCRIPTION OF THE PREFERRED EMBODIMENTS

Figure 1:
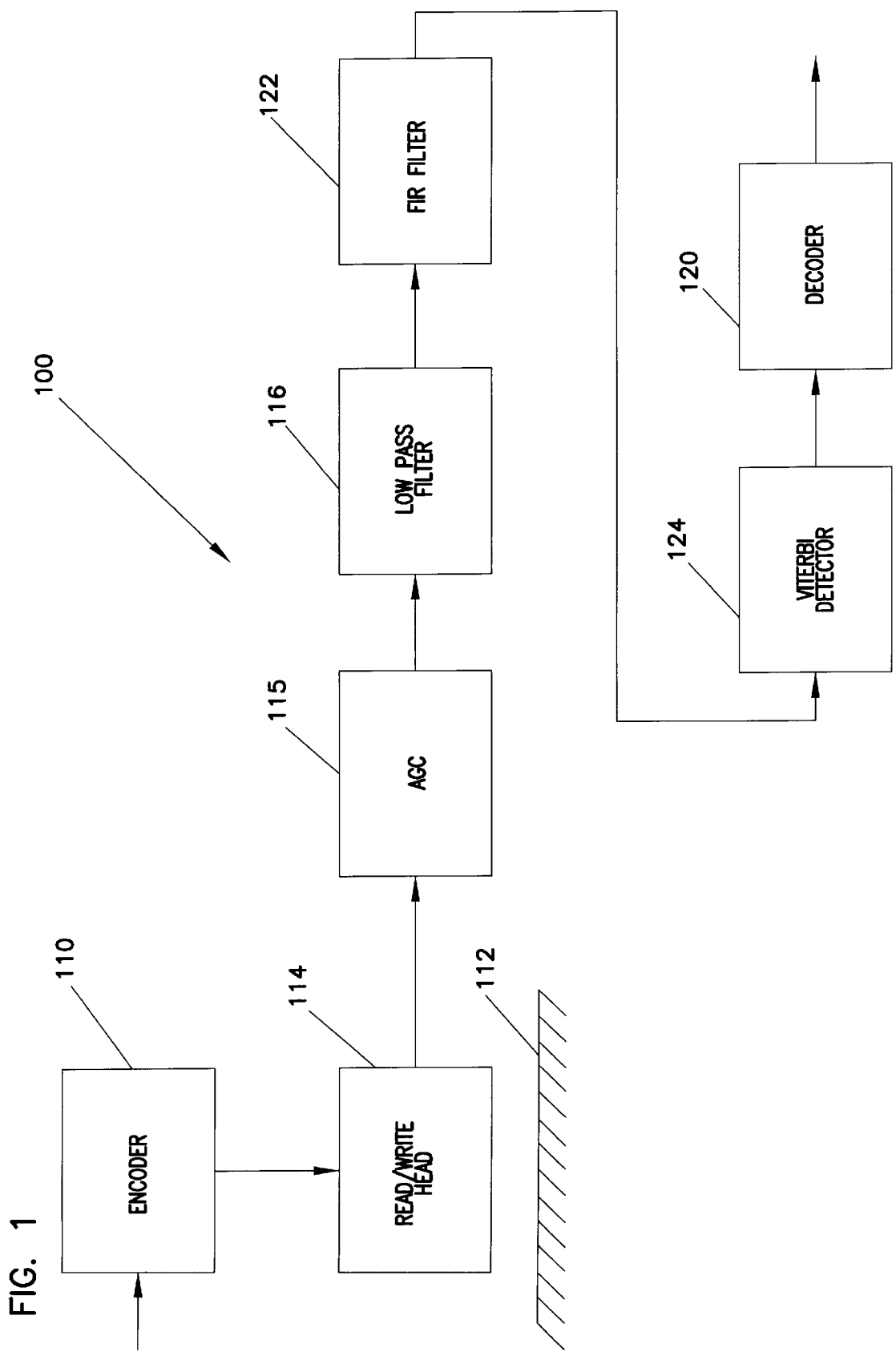
FIG. 1 is a simplified block diagram of a data storage system.

FIG. 1 is a simplified block diagram of a data storage system 100 according to the present invention. System 100 includes encoder 110, disc 112, read/write head 114, automatic gain control (AGC) circuit 115, low pass filter 116, finite impulse response (FIR) filter 122, Viterbi detector 124 and decoder 120. System 100 may also include an analog-to-digital (A/D) converter as well. An actuator assembly (not shown) typically holds read/write head 14 in position over a surface of disc 112. The actuator assembly includes actuator arms which are rigidly coupled to a head gimbal assembly. The head gimbal assembly, in turn, includes a load beam, or flexure arm, rigidly coupled to the actuator arm at a first end thereof, and to a gimbal at a second end thereof. The gimbal is coupled to an air bearing which supports read/write head 114 above the corresponding surface of disc 112 for accessing data within tracks on the surface of disc 112.

In operation, a drive controller associated with the disc drive containing read channel 110 typically receives a command signal from a host system which indicates that a certain portion of disc 112 is to be accessed. In response to the command signal, the drive controller provides a servo control processor with a position signal which indicates a particular cylinder over which the actuator is to position read/write head 114. The servo control processor converts the position signal into an analog signal which is amplified and provided to the actuator assembly. In response to the analog position signal, the actuator assembly positions read/write head 114 over a desired track.

If a write operation is to be performed, data is provided by the drive controller to encoder 110 which encodes the data according to a predetermined code. Such a code may include constraints such as a maximum transition run length code constraint of any desirable size (such as MTR=2). The code constraints may also be time varying. The encoded data is then provided, in the form of a write signal, to read/write head 114. Read/write head 114 then operates to write information on the surface of disc 112 which is indicative of the data encoded in the write signal.

If a read operation is to be executed, read/write head 114 develops a read signal indicative of information in the track over which read/write head 114 is positioned. The read signal is provided to AGC circuit 115 which maintains the signal within an expected range and provides it to low pass filter 116. Low pass filter 116 filters out high frequency components and provides the signal to FIR filter 122. FIR filter 122 is provided to equalize the input signal pulses into a target response (pulses which have fewer non-zero values).

Normal operation of the Viterbi detector 124 is more easily understood using a trellis diagram, which is a typical state machine diagram drawn with discrete time intervals being depicted by a vertical oriented group of states. For example, FIG. 2-A shows a trellis diagram 125 illustrating the operation of Viterbi detector 124. In such a system, there is no intersymbol interference between adjacent pulses at the output of the system. Assuming a user input bit of zero represents no transition or flux reversal read from the disc, and a bit of one represents a transition (i.e., assuming an NRZI coding system), and assuming that the peak sampled value of the equalized transition is one, then an input of zero provides an output of zero, and an input of one provides an output of either one or minus one. This depends on the polarity of the last transition. In other words, each time there is a one in the input sequence, the direction of the write current changes. Given the above system, it is clear that the polarities of transitions must alternate. In another illustrative system, NRZ modulation is used. In such a system, a 1 corresponds to a high and a 0 corresponds to a low.

Figure 2A:
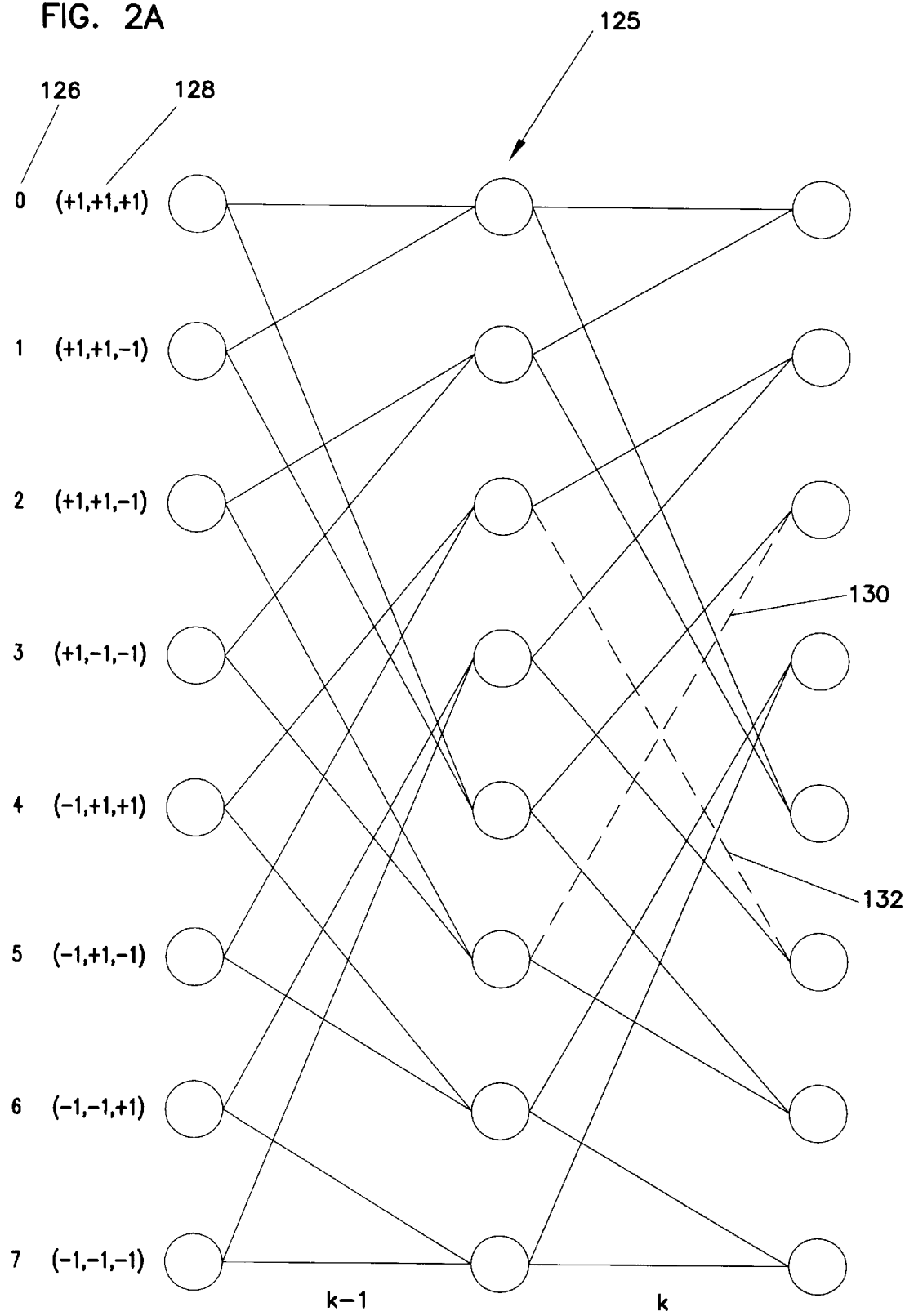
FIG. 2-A is a trellis diagram illustrating operation of a Viterbi detector.
Figure 2B:
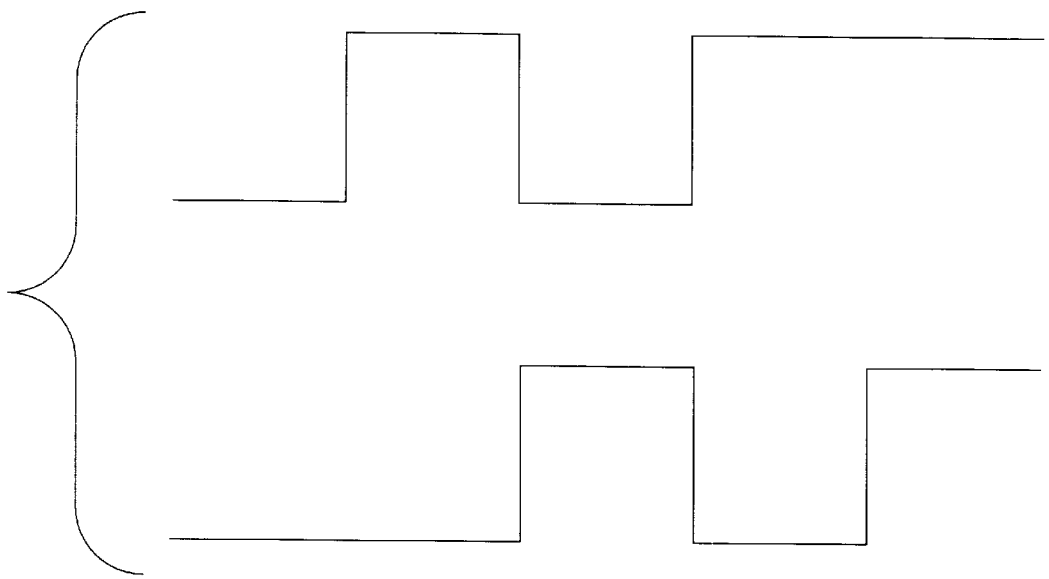
Figure 2C:
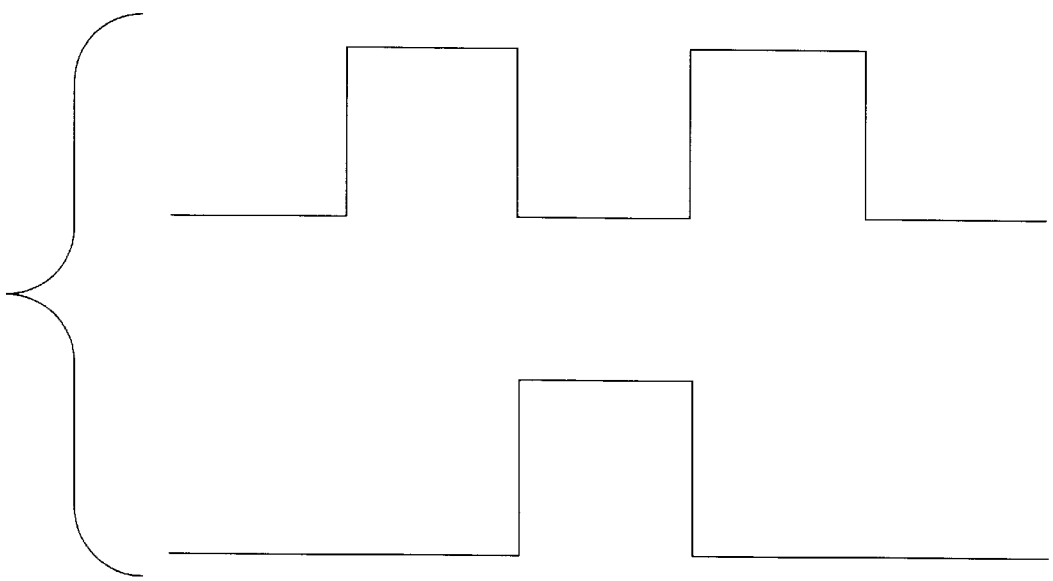

All of these rules (for NRZ modulation) are captured in the state machine diagram shown in FIG. 2-A. Such a trellis diagram can be used to illustrate the detector structure and to determine the noiseless output sequence for any user input sequence.

The particular trellis diagram 125 in FIG. 2-A illustrates a full rate 8-state radix-2 Viterbi detector. Each state of the Viterbi detector is generally implemented as an add-compare select (ACS) unit, as is generally known. The ACS unit adds the metric of each branch to the total metric in its corresponding path. The metrics from the two incoming paths are then compared and the path with the best metric is selected.

FIGS. 2-B and 2-C illustrate dominant error events encountered by Viterbi detectors for maximum likelihood sequence detectors at high linear densities and for higher order partial response channels.

The upper waveform in FIG. 2-B illustrates a tribit (i.e., a waveform having three consecutive transitions). The lower waveform in FIG. 2-B illustrates that the tribit has been shifted to the right one temporal space. The upper waveform in FIG. 2-C illustrates a quadbit (i.e., a waveform having four consecutive transitions). In order to address such error events, MTR codes are used. A relaxed time-variant MTR code allows waveforms having, for example, three transitions, but only allows those tribits to start once every L time intervals.

Trellis 125 describes a Viterbi detector structure used in a channel with a time varying MTR code. The detector described by trellis 125 processes data according to a time varying MTR code in which more than two successive transitions are generally disallowed, but in which three successive transitions are allowed to begin every other sample interval (i.e., a code where MTR=2 and L=2). Trellis 125 includes a state column 126 and a sample input column 128 which illustrates the last three sample input bits. Each state represents a different possible combination of the last three input bits to the channel, denoted by $a_{k-1}a_{k-2}$ and $ak_{k-3}$. In trellis diagram 125, at time k−1, a tribit is allowed. Hence, no modification of trellis 125 is needed at time interval k−1. However, at the next time interval, k, tribits are not allowed so the branches in the trellis diagram which correspond to a tribit pattern must be removed. Such branches correspond to bold, dashed lines 130 and 132 in FIG. 2-1.

FIG. 3 shows an extension of trellis 125 to further illustrate the time variance. In FIG. 3, trellis 125 is extended from time period k−1 to time period k+2. As can be seen, branches 130 and 132 must be removed every other time period, and placed back in the trellis diagram in the remaining periods. Thus, this requires some type of selection mechanism in Viterbi detector 124 such that the mode of the Viterbi detector can be switched to effect the time-varying structure described by trellis 125. The requirement for such a time-varying structure results because Viterbi detector 124 must be designed to enforce the time-varying code constraints used in encoding the data.

FIG. 4 illustrates a trellis diagram 140 which illustrates how Viterbi detector 124 can be implemented as a radix-4 Viterbi detector for the same channel as described with respect to FIGS. 2 and 3.

In such a Viterbi detector, if a number, x, of samples of the received data are to be processed by the Viterbi detector simultaneously, the clock rate of the Viterbi detector is 1/x times the channel clock rate. The Viterbi detector thus releases x bits at the end of each processing step. In that instance, each ACS unit operates on $2^x$ branches and selects the path with the lowest metric.

The trellis diagram 140 in FIG. 4 now includes the code constraints at both even and odd time intervals (i.e., at time intervals k−1 and k). FIG. 4 illustrates that the ACS units for each state in trellis 140 operate on four incoming branches, except those associated with states 2 and 5. Enforcing the same time varying MTR constraints described with respect to FIGS. 2 and 3 removes two of the four branches for both states 2 and 5. Thus, the ACS units for those states only operate on two inputs.

Specifically, in a radix-2 detector, since branch 130 has been removed, state 2 cannot receive any inputs from state 5. The inputs to state 5 are from states 2 and 3. Thus, in a radix-4 detector, state 2 cannot receive any inputs from states 2 and 3.

Similarly, in a radix-2 detector, since branch 132 has been removed, state 5 cannot receive any inputs from state 2. The inputs to state 2 are from states 4 and 5. Thus, in a radix-4 detector, state 5 cannot receive inputs from states 4 and 5.

Thus, FIG. 4 illustrates a trellis 140 which describes a Viterbi detector which is time invariant, but which is used in a channel utilizing a code having time varying code constraints. Such a technique can be used to implement time invariant Viterbi detector structures even with time varying code constraints, so long as the code constraints are periodic over the same number of clock periods which the Viterbi detector is processing in parallel. In other words, in a radix-$2^N$ Viterbi detector, the Viterbi detector is processing N input samples in parallel. Where N is greater than 1, and where the time varying code constraints are periodic over N samples, the present invention can be used such that Viterbi detectors in channels using the code are time invariant. The branches which would periodically be removed from the trellis structure of the Viterbi detector are simply removed permanently. This significantly reduces the complexity of the Viterbi detector, because branches are removed, and because no switching mechanism is needed for switching between Viterbi detector modes.

Figure 5A:
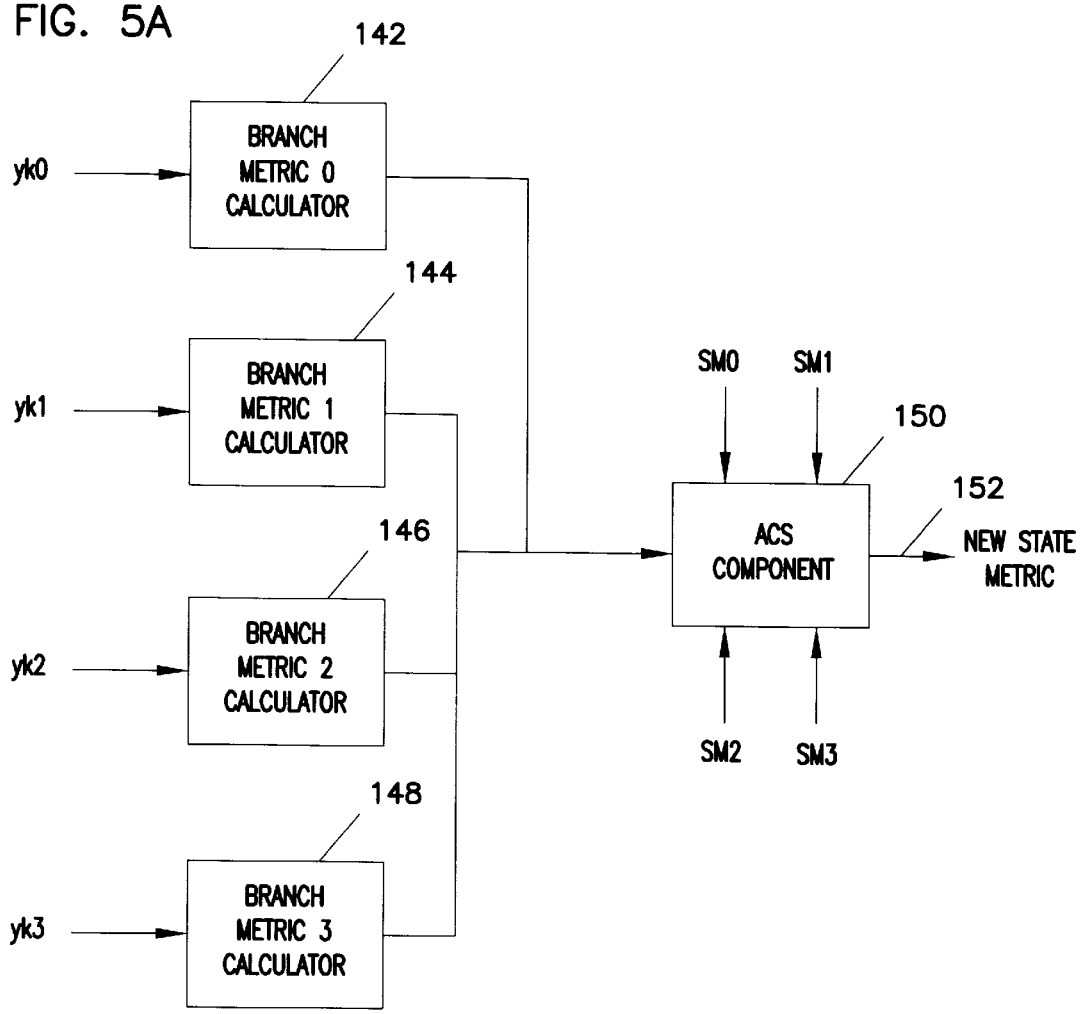
FIGS. 5-A and 5-B are block diagrams illustrating the logical function of a Viterbi detector in accordance with one aspect of the present invention.
Figure 5B:
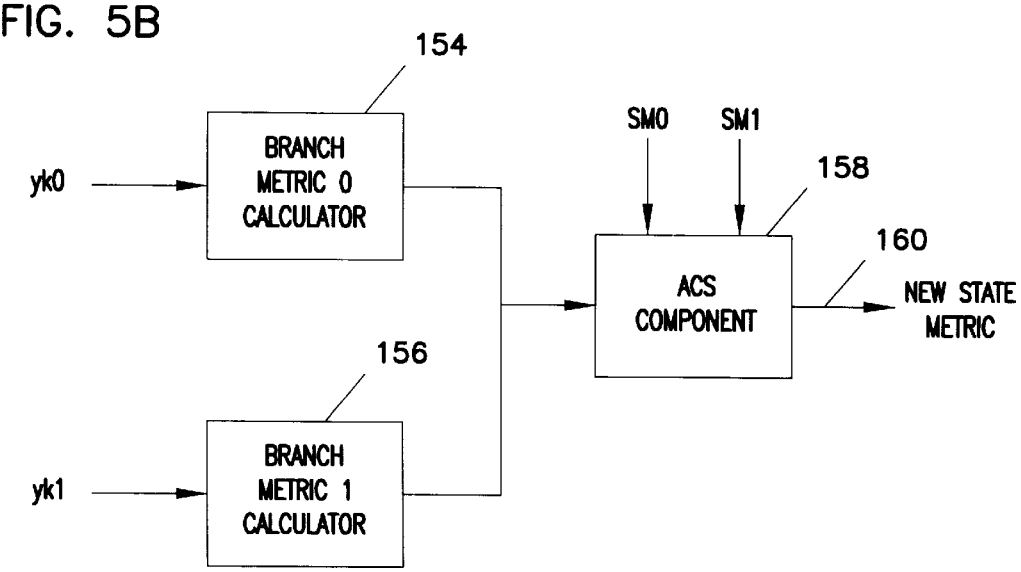

FIGS. 5-A and 5-B are block diagrams illustrating the operation of a Viterbi detector in accordance with one aspect of the present invention. FIG. 5-A illustrates the operations of a Viterbi detector at state zero of the trellis structure shown in FIG. 4. The operation of all other states, except states 2 and 5, is similar to that shown in FIG. 5-A. FIG. 5-B illustrates the operation of the Viterbi detector at state 2 of the trellis structure 140 shown in FIG. 4. The operation of the Viterbi detector at state 5 is similar to that illustrated in FIG. 5-B.

FIG. 5-A shows that the Viterbi detector logically includes four branch metric calculator components 142, 144, 146 and 148, and an add-compare-select (ACS) component 150. Branch metric calculator components 142–148 calculate the branch metrics associated with the branches leading from states 0, 1, 2 and 3 at time period k−1, into state 0 at time period k in the trellis structure 140 shown in FIG. 4. Branch metric calculator components 142–148 calculate the branch metrics based on the samples received and based on the desired values, in a known manner, and provide the branch metrics to ACS component 150. ACS component 150 receives the state metrics from states 0–4 at time period k−1 and adds those to the branch metrics for the branches leading from states 0–3 at time period k−1, and selects the lowest value as the state metric for state 0 at time period k. The new state metric is provided at output 152 to a suitable storage mechanism.

By contrast, FIG. 5-B illustrates the operation of the Viterbi detector which corresponds to trellis structure 140 at state 2 in time period k. FIG. 5-B illustrates that only two branch metric calculator components 154 and 156 are needed, and are supplied to ACS component 158. Branch metric calculator components 154 and 156 need to calculate only the branch metrics associated with the branches which lead from states 0 and 1 at time period k−1 to state 2 at time period k. Since only two branches lead to state 2 at time period k, only two branch metric calculator components are needed.

The branch metrics are provided to ACS component 158. ACS component 158 receives the state metric values associated with states 0 and 1 at time period k−1 and adds those values to the branch metrics calculated by components 154 and 156. ACS component 158 then selects the lower of those two values and provides it as the new state metric at output 160 and corresponding to state 0 at time period k. It can be seen that the number of branch metric calculator components required by a Viterbi detector in accordance with the present invention is reduced over that in prior Viterbi detectors, and does not vary from interval to interval. This provides a significant savings and reduced complexity over prior Viterbi detectors.

The present invention can be used to not only simplify Viterbi detectors by removing branches, but it can also be used in permanently removing states from the Viterbi detector trellis. For example, application of a time-varying MTR code to an 8 state detector, as described above, does not result in the removal of any states at any time. However, for a 16 state detector, where each state specifies the last four input channel bits (given by $a_{k-1}$, $a_{k-2}$, $a_{k-3}$, and $a_{k-4}$) the two states denoted by +/− (+1, −1, +1, −1) are removed from the radix-2 trellis at every other step in order to enforce the time varying constraints in the MTR code.

In a radix-4 architecture, however, these two states can be removed at all times. Tables 1 and 2 define a trellis structure corresponding to such a radix-4 architecture. Table 1 illustrates the branch metrics for the detector.

Table 2 illustrates the branch metrics for a time-invariant radix-4 MTR-coded $E^2PR4$ channel. In the radix-4 architecture, as described above, each branch metric is the sum of the branch metrics at times k−1 and k. These metrics are given by $(Y_{k-1}-d_{k-1})^2$, and $(Y_k-d_k)^2$ where $y_{k-1}$ and $y_k$ denote the detector inputs for time intervals k−1 and k, respectively; and $d_{k-1}$ and dk denote the desired values for the given branches at time intervals k−1 and k.

Table 2 shows for each state, the states from which input branches are received, the desired values, the branch metrics used, and the total branch metric. Table 2 illustrates that, not only are two states removed from the detector trellis, but states 1, 2, 5, 8, 11 and 12 only operate on three input branches.

The metrics illustrated could be further simplified. For example, in Table 2, one such simplification is performed by removing the $y^2_{k-1}$ and $y^2_k$ terms from all branches at times k−1 and k, and dividing the resulting metrics by 4.

Therefore, it can be seen that the present invention can be utilized to simplify Viterbi detectors in channels with a generalized PR target, as well as reduced state sequence estimators (RSSE). For an MTR code which allows maximum transition runs to begin every L time periods (where L is greater than or equal to 2), a time-invariant radix-$2^L$ detector, which operates on L samples at every processing step, can also be implemented. Of course, the present invention can also be extended to an implementation in which more than L samples are processed at each processing step. Generally, in order to process jL samples simultaneously, a radix-j$(2)^L$ time-invariant detector can be implemented, where j is greater than zero.

The present invention includes a detector 124 for detecting data encoded in a read signal received from a storage channel 100. A Viterbi detector 124 has a time-invariant structure 140 (or as described in Tables 1 and 2) configured to detect the data encoded according to a code having time variant constrains. The Viterbi detector 124, in one preferred embodiment, is a radix-$2^N$ Viterbi detector which detects data encoded over N clock cycles in the read signal, substantially in parallel. The code has time varying constraints which are periodic on N cycles, where N is greater than 1.

In a more specific embodiment, Viterbi detector 124 is used in a channel utilizing a code having maximum transition run length constraints which constrains the maximum transition runs in the read signal to begin no more frequently than every L clock cycles. The Viterbi detector 124 is then provided as a $2^L$ Viterbi detector.

Viterbi detector 124 is represented by a trellis diagram 140 having a plurality of sets of states 128, each set corresponding to a processing interval, each state 126 having a corresponding state metric. The states 126 in each set are connected to at least one state in another set by branches. Each branch has a corresponding branch metric. In one embodiment, the number of allowable states 126 in each set periodically varies between a higher number and a lower number over N clock cycles. The radix-$2^N$ Viterbi detector 124 is implemented such that it corresponds to a trellis diagram having only the lower number of states 126 in every set.

The present invention can be implemented in a disc drive which includes a computer readable disc 112 for storing the information, as well as an encoder 110 for encoding the information, and the remainder of the read channel described above.

The present invention can also be implemented as a method of forming a detector 124. The method includes detecting data in a channel utilizing a code having time varying constraints on a time-invariant Viterbi detector 124. In one embodiment, the method includes providing a radix-$2^N$ Viterbi detector 124 which detects data encoded over N clock cycles substantially in parallel, where the code has time varying constraints which are periodic on N clock cycles, and where N is greater than one.

In one preferred embodiment, the code also has a maximum transition run length constraint which constrains maximum transition runs in the read signal to begin no more frequently than every L clock cycles. In that embodiment, the step of providing a radix-$2^N$ Viterbi detector is accomplished by providing a radix-$2^L$ Viterbi detector 124.

The present invention can also be implemented as a method of detecting data in which a time invariant Viterbi detector 124 is configured with a time invariant structure 140 which allows the Viterbi detector 124 to detect data encoded according to a code having time varying constraints.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular channel response target while maintaining substantially the same functionality without departing from the scope and spirit of the present invention.

What is claimed is:

1. A method of detecting data in a storage channel, the data being encoded according to a code having a time varying constraint, the method comprising a step of:

providing a Viterbi detector represented by a trellis structure having a plurality of states connected by branches, each state having an associated state metric and each branch having an associated branch metric;

receiving the data encoded according to the code;

determining, for each state, the branch metrics for a predetermined number of branches connected to the state, the predetermined number being time invariant;

determining, for each state, the state metric associated with the state based on the branch metrics and previous state metrics from states from which the branches connected to the state originate; and detecting data based on the state metrics determined for each state.

2. The method of claim 1 wherein the receiving step comprises a step of:
   receiving the data in a sampled read signal including data samples provided in a plurality of time periods.

3. The method of claim 2 wherein the steps of determining the branch metrics and determining the state metrics are performed for each state once over a plurality of time periods.

4. The method of claim 3 wherein the time varying constraint includes a run constraint which varies between at least a first constraint and a second constraint over the plurality of time periods.

5. The method of claim 4 wherein the plurality of time periods comprises N time periods and wherein the providing step comprises a step of:
   providing a radix $2^N$ Viterbi detector which detects data provided over the N time periods substantially in parallel.

6. The method of claim 5 wherein the time varying constraint comprises a maximum transition run length constraint which constrains maximum transition runs in the read signal to begin no more frequently than every N time periods.

7. The method of claim 2 wherein the Viterbi detector is represented by a trellis structure having a plurality of sets of states, each set corresponding to a processing interval, the code having a number of allowable states in each set which periodically varies between a higher number and a lower number over N clock cycles, and wherein the steps of determining the branch metrics and determining the state metrics are performed only for the lower number of states in every set.

8. A detector for use in detecting data in a storage channel, the data being encoded according to a code having a time varying constraint, the detector comprising:
   a Viterbi detector represented by a trellis structure having a plurality of states connected by branches, each state having an associated state metric and each branch having an associated branch metric, the Viterbi detector further comprising, for each state:
      at least one branch metric component determining a predetermined number of branch metrics for the branches leading to the state, the predetermined number being time invariant; and
      a state metric component determining a state metric associated with the state based on the branch metrics and based on previous state metrics corresponding to previous states from which the branches connected to the state originated.

9. The detector of claim 8 wherein the Viterbi detector includes a receiver receiving data samples at a read signal clock rate.

10. The detector of claim 9 wherein the states in the trellis structure are configured as a plurality of sets of states, each set corresponding to a processing interval, each state having a corresponding state metric, the states in each set being connected to at least one state in another set by branches, each branch having a corresponding branch metric, and wherein the code requires a number of allowable states to periodically vary between a higher number and a lower number over multiple cycles of the read signal, and wherein the trellis structure has the lower number of states in each set.

11. The detector of claim 10 wherein the Viterbi detector comprises:
   a radix-$2^N$ Viterbi detector clocked by a clock signal having clock cycles, and wherein the code has time varying constraints which are periodic on N clock cycles, where N>1.

12. The detector of claim 9 wherein the radix $2^N$ Viterbi detector has a structure configured to detect data wherein the code has a maximum transition run length constraint which constrains maximum transition runs in the read signal to begin no more frequently than every L clock cycles.

13. The detector of claim 12 wherein the radix $2^N$ Viterbi detector comprises:
   a radix $2^L$ Viterbi detector.

14. A communication channel, comprising:
   an encoder configured to encode data into code words having time varying constraints;
   a rotatable data storage disc which receives and stores encoded data; and
   a read channel which reads encoded data from the disc, the read channel including a Viterbi detector having a time invariant structure configured to receive a read signal indicative of the encoded data read from the disc and detect the encoded data in the read signal.

15. The communication channel of claim 14 wherein the Viterbi detector is represented by a trellis structure having a plurality of states connected by branches, each state having an associated state metric and each branch having an associated branch metric, the Viterbi detector further comprising, for each state:
   at least one branch metric component determining a predetermined number of branch metrics for the branches leading to the state, the predetermined number being time invariant; and
   a state metric component determining a state metric associated with the state based on the branch metrics and based on previous state metrics corresponding to previous states from which the branches connected to the state originated.

16. The communication channel of claim 15 wherein the Viterbi detector includes:
   a receiver receiving data samples at a read signal clock rate, wherein the states in the trellis structure are configured as a plurality of sets of states, each set corresponding to a processing interval, each state having a corresponding state metric, the states in each set being connected to at least one state in another set by branches, each branch having a corresponding branch metric, and wherein the code requires a number of allowable states to periodically vary between a higher number and a lower number over multiple cycles of the read signal, and wherein the trellis structure has the lower number of states in each set.

17. A method of detecting data encoded in a read signal according to a code having time varying constraints, the read signal being received from a read channel, the method comprising steps of:
   providing a Viterbi detector having a time-invariant structure which enforces the time varying constraints on the code;
   receiving the read signal at the Viterbi detector; and
   detecting data in the read signal with the Viterbi detector.

18. The method of claim 17 wherein the providing step comprises:
   providing the Viterbi detector represented by a trellis structure having a plurality of states connected by branches, each state having an associated state metric and each branch having an associated branch metric.

19. The method of claim 18 wherein the detecting step comprises:
- determining, for each state, the branch metrics for a predetermined number of branches connected to the state, the predetermined number being time invariant;
- determining, for each state, the state metric associated with the state based on the branch metrics and previous state metrics from states from which the branches connected to the state originate; and
- detecting data based on the state metrics determined for each state.

20. A data storage channel for receiving and storing encoded data, comprising:
- a data storage disc; and
- means, operably coupled to the data storage disc and having a time invariant structure, for detecting data read from the disc and encoded according to a code having a time varying maximum transition run constraint.

* * * * *